(12) United States Patent
Fabjański et al.

(10) Patent No.: US 12,300,048 B2
(45) Date of Patent: May 13, 2025

(54) IN-FIELD ENCODING OF ACCESS CREDENTIALS

(71) Applicant: ASSA ABLOY AB, Stockholm (SE)

(72) Inventors: Krzysztof Grzegorz Fabjański, Bielsko-Biala (PL); Karol Lukasz Świtała, Cracow (PL)

(73) Assignee: ASSA ABLOY AB, Stockholm (SE)

( * ) Notice: Subject to any disclaimer, the term of this patent is extended or adjusted under 35 U.S.C. 154(b) by 467 days.

(21) Appl. No.: 17/451,519

(22) Filed: Oct. 20, 2021

(65) Prior Publication Data
US 2023/0119797 A1   Apr. 20, 2023

(51) Int. Cl.
*G07C 9/00* (2020.01)
*H04W 12/03* (2021.01)
*H04W 12/08* (2021.01)

(52) U.S. Cl.
CPC ........ *G07C 9/00309* (2013.01); *H04W 12/03* (2021.01); *H04W 12/08* (2013.01); *G07C 2009/00396* (2013.01); *G07C 2009/00412* (2013.01); *G07C 2009/00968* (2013.01)

(58) Field of Classification Search
CPC .................. G07C 9/00309; G07C 2009/00396
See application file for complete search history.

(56) References Cited

U.S. PATENT DOCUMENTS

| 2016/0249159 | A1* | 8/2016 | Berg | H04W 12/04 |
| 2017/0311161 | A1 | 10/2017 | Kuenzi | |
| 2021/0209876 | A1* | 7/2021 | Jiang | G07C 9/00896 |
| 2021/0225100 | A1 | 7/2021 | Jones et al. | |
| 2023/0083785 | A1* | 3/2023 | Maiman | G06Q 20/3821 340/5.65 |
| 2023/0179420 | A1* | 6/2023 | Ramanujan | H04L 63/0807 713/159 |

FOREIGN PATENT DOCUMENTS

EP   3062295   8/2016

OTHER PUBLICATIONS

"International Application Serial No. PCT/EP2022/078711, International Search Report mailed Jan. 23, 2023", 3 pgs.
"International Application Serial No. PCT/EP2022/078711, Written Opinion mailed Jan. 23, 2023", 9 pgs.

* cited by examiner

*Primary Examiner* — Nabil H Syed
(74) *Attorney, Agent, or Firm* — Schwegman Lundberg & Woessner, P.A.

(57) ABSTRACT

A method and system for in-field encoding of credentials to a credential device. An example method comprises receiving a request to at least one of add or update credentials to a credential device; providing an invitation code for an in-field device, the in-field device being separate from the credential device; receiving, from the in-field device, the invitation code along with information from the credential device for establishing a secure communication channel with the credential device; establishing a secure communication channel with the credential device using the in-field device as an intermediate; generating one or more commands for encoding credentials to the credential device based on the request; and sending the one or more commands, via the secure communication channel using the in-field device as an intermediate, to the credential device.

18 Claims, 6 Drawing Sheets

IN-FIELD ENCODING OF ACCESS CREDENTIALS

TECHNICAL FIELD

Embodiments described herein generally relate to encoding access credentials to a credential device, and particularly to in-field encoding of access credentials.

BACKGROUND

There are many applications for which encoding access credentials to a credential device is desirable. Some examples include physical and logical access control systems. Physical access control includes identification of authorized users or devices (e.g., vehicles, drones, etc.) and actuation of a gate, door, or other mechanism used to secure an area or actuation of a control mechanism, e.g., a physical or electronic/software control mechanism, permitting access to a secure physical asset, such as but not limited to a computing device (e.g., desktop computer, mobile device, wearable electronic device, copier/printer, and the like). Logical access control includes identification of authorized users or devices to provide access to logical assets, such as but not limited to, an application, a cloud-based service, or a financial or personal account. A credential device, in general, may include any device that carries evidence of authority, status, rights, and/or entitlement to privileges for a holder of the credential device, including any portable device (such as a credential card, electronic key, mobile phone, etc.) having memory storing one or more user credentials or credential data. Non-limiting example credential devices include various credential devices offered by HID Global Corporation, based in Austin, Texas.

Conventionally, there are generally only a couple ways to encode access credentials to a credential device. A first method for encoding access credentials to a credential device is preprogramming the appropriate credential(s) at the factory of the manufacturer or other provider of the credential device (such as a credential card manufacturer or provider). In such cases, any need to change data on an issued credential device, such as a need to add new or updated credentials, requires a new credential device (e.g., a plastic credential card) to be encoded with the appropriate credentials, thereby replacing the old one, which can be time consuming and inefficient, more costly, and lead to increased waste. Another method for encoding access credentials to a credential device is encoding the credentials after deployment of the credential device in the field, or "in-field," using limited and specialized equipment, such as a desktop encoding device. A non-limiting example of such an encoding device is the HID® iCLASS SE® CP1000 Encoder offered by HID Global Corporation, based in Austin, Texas. Access to and control of such specialized equipment, however, is typically limited, for example, to a local administrator or relatively small number of local administrators that are in-field, such as but not limited to an administrator of the manufacturer/provider of the credential device(s) (that can be deployed by the manufacturer/provider in-field to encode one or more credential devices on-site) or an in-field administrator or security officer employed by the owner of an access control system utilizing the credential device(s). These methods limit the applications for the population of existing credential devices, requiring either new credential devices to be encoded and provided by the manufacturer/provider of the credential devices or requiring holders of already-deployed credential devices to locate and physically meet with a local administrator with access to a specialized encoding device. Thus, solutions are desirable that would enable a holder of a credential device to securely encode or program access credentials to a credential device in the field in a manner that avoids both the need to reorder a new credential device and the need to physically locate and meet with a local administrator with access to a specialized encoding device.

BRIEF SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a method for in-field encoding of credentials to a credential device. The method comprises receiving a request to at least one of add or update credentials to a credential device; providing an invitation code for an in-field device, the in-field device being separate from the credential device; receiving, from the in-field device, the invitation code along with information from the credential device for establishing a secure communication channel with the credential device; establishing a secure communication channel with the credential device using the in-field device as an intermediate; generating one or more commands for encoding credentials to the credential device based on the request; and sending the one or more commands, via the secure communication channel using the in-field device as an intermediate, to the credential device.

The present disclosure, in one or more embodiments, additionally relates to a method for in-field encoding of credentials to a credential device. The method comprises receiving, at an in-field device, an invitation code corresponding to a request to at least one of add or update credentials to a credential device, the credential device being separate from the in-field device; establishing, with the in-field device, a communication with the credential device to request information from the credential device for establishing a secure communication channel with the credential device; receiving, at the in-field device the information from the credential device and forwarding the information from the credential device along with the invitation code to a credentialing service; receiving, at the in-field device, from the credentialing service, one or more commands for encoding credentials to the credential device based on the request; and forwarding, from the in-field device, the one or more commands to the credential device, enabling the credential device to encode the credentials to the credential device.

The present disclosure, in one or more embodiments, additionally relates to a non-transitory computer readable medium comprising executable program code, that when executed by one or more processors of an in-field device, causes the one or more processors to receive an invitation code corresponding to a request to at least one of add or update credentials to a credential device, the credential device being separate from the in-field device; establish a communication with the credential device to request information from the credential device for establishing a secure communication channel with the credential device; receive the information from the credential device and forward the information from the credential device along with the invitation code to a credentialing service; receive one or more commands from the credentialing service for encoding credentials to the credential device based on the request; and forward the one or more commands to the credential device, enabling the credential device to encode the credentials to the credential device.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the scope of the present disclosure. Accordingly, the drawings and detailed description are to be regarded as illustrative in nature and not restrictive.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The present disclosure generally relates to encoding access credentials to a credential device, and particularly to in-field encoding of access credentials. In general, in-field encoding of access credentials is designed to enable a holder of a credential device to securely encode or program access credentials to the credential device in the field, avoiding both the need to reorder a new credential device and the need to physically locate and meet with a local administrator with access to a specialized encoding device.

Figure 1:
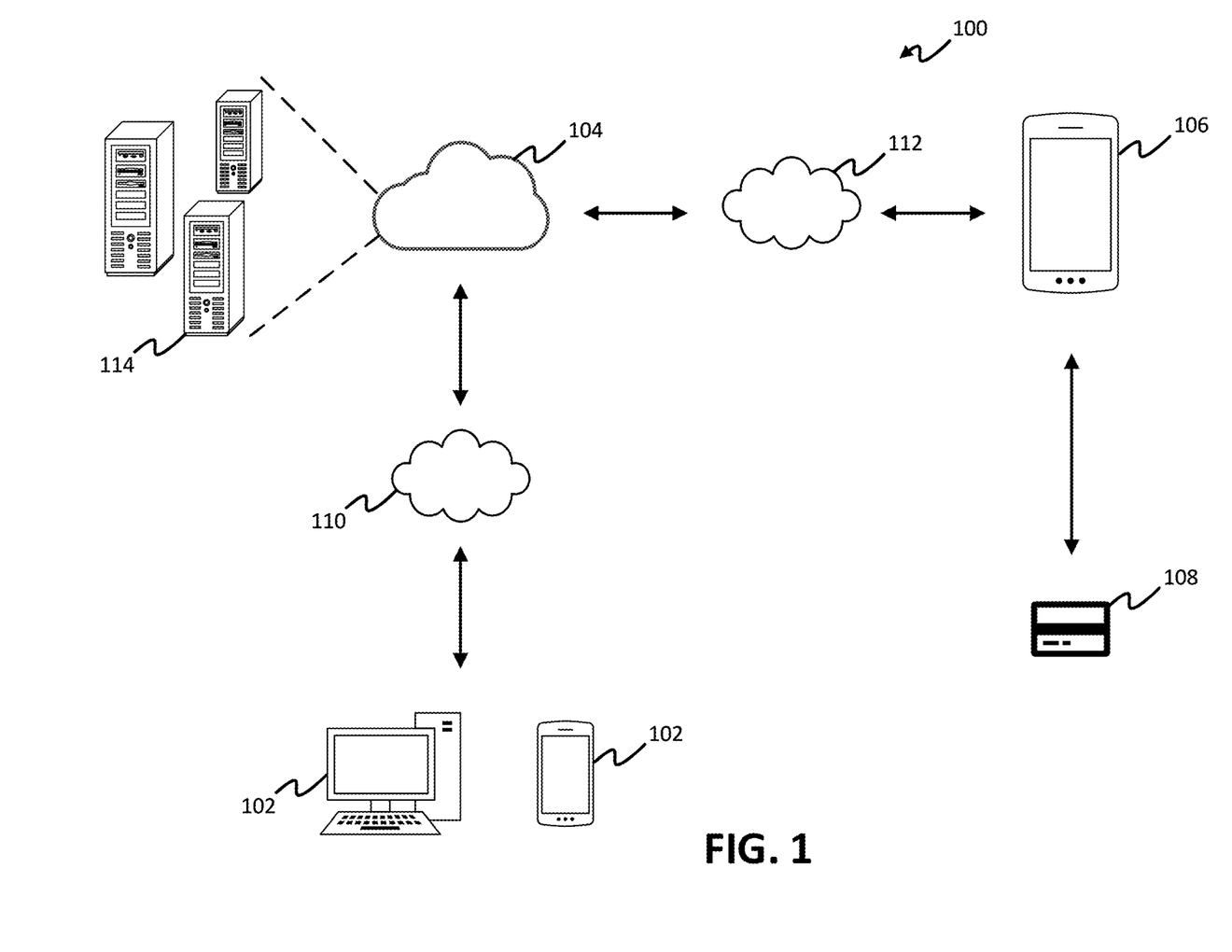
FIG. 1 illustrates an example system for in-field encoding of access credentials to a credential device.

FIG. 1 illustrates an example system 100 for in-field encoding of access credentials to a credential device. System 100 can generally include an administrator device 102, a cloud or credentialing service 104, which may be referred to herein simply as cloud service, an in-field device 106, and a credential device 108, as well as one or more communication networks 110, 112 for communication between devices within the system.

Administrator device 102 may be any suitable computing device, such as but not limited to a personal computer (PC), a tablet PC, a personal digital assistant (PDA), or a mobile telephone. Administrator device 102 may be owned by, issued to, or operated by a user managing access rights or access credentials, such as but not limited to an administrator or security officer employed by the owner of an access control system utilizing credential devices, such as credential device 108.

Cloud service 104 may be any suitable combination of hardware and/or software components providing a credentialing service and any other service(s) related thereto. In some examples, cloud service 104 may comprise one or more networked servers 114 or server clusters and any other suitable devices, such as but not limited to a network router(s), switch(es), or bridge(s), for connecting, administrating, and/or managing the server(s) 114. Cloud service 104 may be accessed via administrator device 102. Administrator device 102 and cloud service 104 may be in communication with one another through communication network 110.

Communication network 110 may be any suitable wired or wireless network, such as but not limited to a local area network (LAN), a wide area network (WAN), a packet data network (e.g., the Internet), a mobile telephone network (e.g., cellular network), a Plain Old Telephone (POTS) network, a wireless data network (e.g., IEEE 802.11 family of standards known as Wi-Fi or IEEE 802.16 family of standards known as WiMax), any network based on the IEEE 802.15.4 family of standards, and a peer-to-peer (P2P) network, or any suitable combination of wired and/or wireless networks.

In-field device 106 may be any suitable computing device, such as but not limited to a PC, a tablet PC, a PDA, or a mobile telephone. In some examples, in-field device 106 may be a device owned by, issued to, or operated by a user/holder of credential device 108, such as but not limited to a smartphone of the user/holder of the credential device. However, in-field device 106 need not be a device owned by, issued to, or operated by a user/holder of credential device 108, and instead could be a device owned by, issued to, or operated by another user. In-field device 106 and cloud service 104 may be in communication with one another through communication network 112. Communication network 112 may be any suitable wired or wireless network, such as but not limited to a local area network (LAN), a wide area network (WAN), a packet data network (e.g., the Internet), a mobile telephone network (e.g., cellular network), a Plain Old Telephone (POTS) network, a wireless data network (e.g., IEEE 802.11 family of standards known as Wi-Fi or IEEE 802.16 family of standards known as WiMax), any network based on the IEEE 802.15.4 family of standards, and a peer-to-peer (P2P) network, or any suitable combination of wired and/or wireless networks. Communication networks 110, 112 may be the same network or combination of networks or may be different networks.

Credential device 108 may generally include any device that carries evidence of authority, status, rights, and/or entitlement to privileges for a holder of the credential device. Credential device 108 may be any suitable tangible credential device having any suitable form factor. Example credential devices 108 include, but are not limited to, RFID smartcards or other proximity-based cards, access control cards, electronic keys, key fobs, suitable near field communications (NFC)-enabled devices, tags, personal electronic devices, such as mobile phones, tablet PCs, wearable electronic devices, or PDAs, or any device configurable to emulate a credential. Credential device 108 may generally include memory, storing, for example, one or more user credentials or credential data and any program instructions, and a reader interface (e.g., an antenna and Integrated Circuit (IC) chip), which permits the credential device to process instructions and/or exchange data with another device. Credential device 108 and in-field device 106 may communicate directly with one another using any suitable communication protocol, such as but not limited to one or more wireless communication protocols such as the IEEE 802.15.1, Bluetooth, Bluetooth Low Energy (BLE), near field communications (NFC), ZigBee, GSM, CDMA, Wi-Fi, radio frequency (RF), ultrawide band (UWB), and the like. In some examples, in-field device 106 may comprise or be the same as credential device 108 or in-field device 106 and credential device 108 may be provided on a single device and may use any suitable mechanism(s) or communication protocol(s) for communicating therebetween within the single device.

Figure 2A:
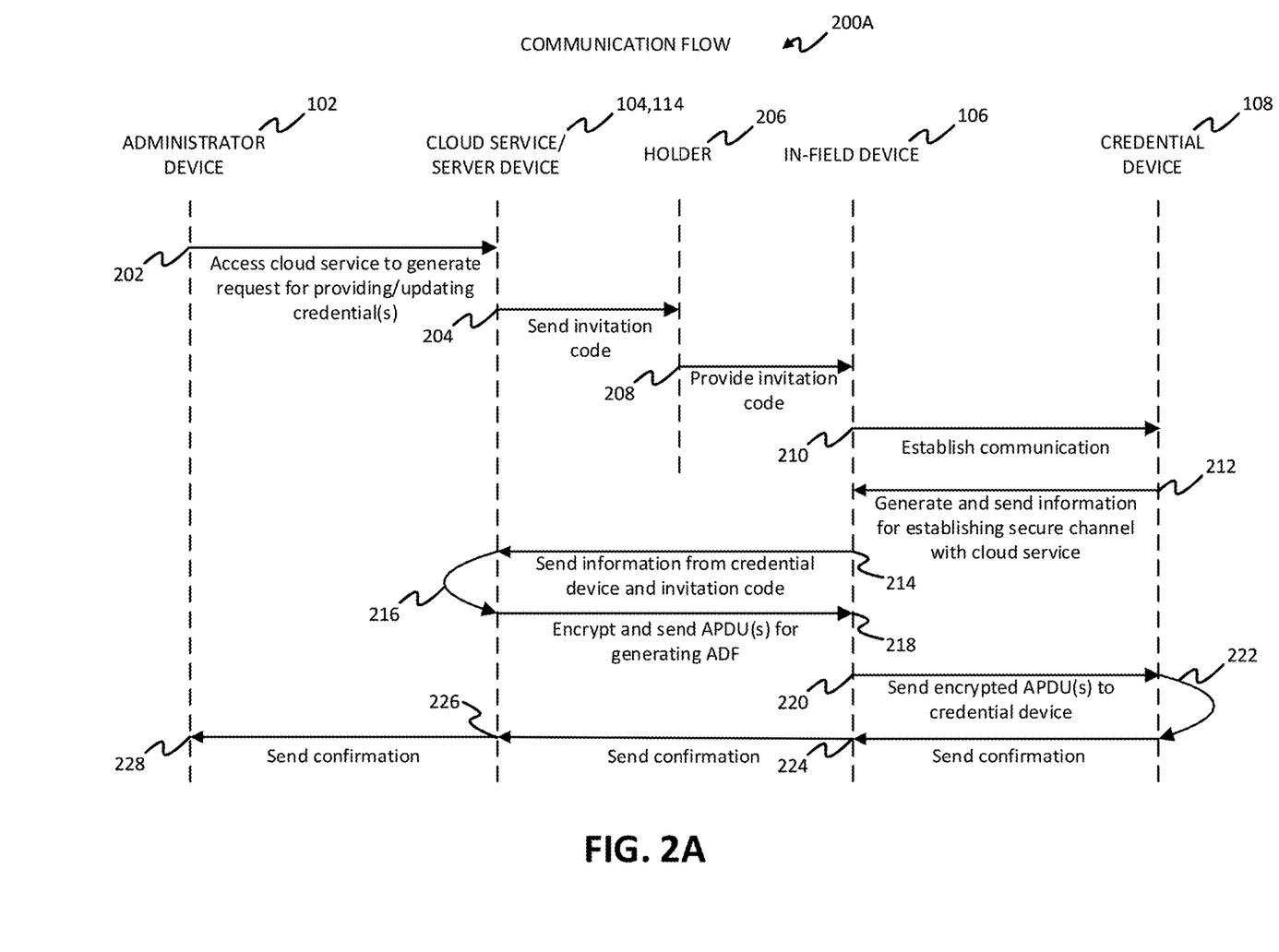
FIG. 2A illustrates an example method or communication flow for in-field encoding of access credentials to a credential device.

FIG. 2A illustrates an example method or communication flow for in-field encoding of access credentials to a credential device 200A, according to the present disclosure. In step 202, administrator device 102 may access cloud service 104 and/or server device(s) 114 (which may be referred to collectively or individually herein simply as cloud service 104), such as via network 110, to generate a request for encoding one or more credentials to credential device 108 and/or encoding an update to one or more credentials stored on the credential device. The request may be assigned an invitation code or other identifier (referred to herein simply as invitation code). The invitation code may be any suitable code or identifier, such as but not limited to, an alphanumeric code, bar code, QR code, or the like. The invitation code may be substantially unique, or at least substantially unique over a defined or predetermined period of time.

In step 204, cloud service 104 may send the invitation code to a user/holder 206 of in-field device 106. In examples, the invitation code is sent via an out-of-band (OOB) communication method; that is, by a communication method other than a direct communication between cloud service 104 and in-field device 106. The invitation code may be sent to user/holder 206 by any suitable means of communication, including but not limited to, email, text (e.g., SMS or MMS messaging), voicemessage, app notification, automated telephone call, or standard mail. In some particular examples, the invitation code is sent to user/holder 206 by email, text, or app notification, and is accessible or retrievable via electronic means, such as through an electronic device of the user/holder 206, such as but not limited to a PC, a tablet PC, a PDA, or a mobile telephone of the user/holder 206, which in some examples could be in-field device 106.

In step 208, user/holder 206 provides the invitation code to in-field device 106. In some examples, in-field device 106 stores and can execute an app for facilitating in-field encoding of credential devices. In some examples, such an app may not have any other functionality or business logic beyond that triggered by cloud service 104 and/or required to complete steps performed by in-field device 106 described herein. As such, such an app may act merely as a proxy between cloud service 104 and credential device 108. In some examples, such an app may also include additional or other functionality, such as but not limited to access control. In step 208, user/holder 206 may provide the invitation code to in-field device 106 via the app. In an example, user/holder 206 may provide the invitation code to in-field device 106 by opening or activating the app via an app notification (e.g., a push notification) sent in step 204.

In step 210, in-field device 106, or the app executing on the in-field device, may establish communication with credential device 108. As indicated above, in-field device 106 may establish communication with credential device 108 using any suitable communication protocol, such as but not limited to one or more wireless communication protocols such as the IEEE 802.15.1, Bluetooth, Bluetooth Low Energy (BLE), near field communications (NFC), ZigBee, GSM, CDMA, Wi-Fi, RF, UWB, and the like. In step 210, in-field device 106 may request information from credential device 108 for establishing a secure communication channel with cloud service 104, which may be used for, as an example but not limited to, Seos secure messaging, Global Platform secure messaging, or an mTLS session.

In step 212, credential device 108 may send the requested information for establishing a secure communication channel with cloud service 104 to in-field device 106. In some examples, credential device 108 may first generate the information for establishing a secure communication channel with cloud service 104 prior to sending to in-field device 106. The requested information may be any suitable or conventional information for establishing a secure channel between devices. In some examples, the information for establishing a secure communication channel with cloud service 104 may include one or more cryptographic keys, such as one or more asymmetric or symmetric keys, that will be used to encrypt communication between the cloud service and credential device 108. In some alternative or additional examples, the information for establishing a secure communication channel with cloud service 104 may include information that is used or required, at least in part, to generate one or more cryptographic keys, such as one or more asymmetric or symmetric keys, that will be used to encrypt communication between the cloud service and credential device 108. In some examples, the requested information may be encrypted prior to sending to in-field device 106, such that the in-field device does not have access to the unencrypted information. In addition, requested information and/or any other portion of data being sent by credential device 106 may be encrypted at the payload level (e.g., at rest encryption).

In step 214, in-field device 106 passes along the information for establishing a secure communication channel with cloud service 104 along with the invitation code to cloud service 104, such as via network 112. In-field device 106 may generally act as an intermediate or proxy device for communication between cloud service 104 and credential device 108. In this regard, in-field device 106 need not, and in some cases should not, be able to decrypt or interpret any communication between cloud service 104 and credential device 108 or otherwise have access to any unencrypted information communicated between the cloud service and the credential device.

In step 216, cloud service 104 may confirm the invitation code and/or decrypt, if needed, and confirm the information from credential device 108 received via in-field device 106. If needed, cloud service 104 may generate any additional information needed for secure communication with credential device 108. Cloud service 104 may determine the request received from administrator device 102 (step 202) corresponding to the invitation code received from in-field device 106, and based on the request received from the administrator device corresponding to the invitation code, the cloud service may compute one or more commands (e.g., application protocol data unit(s) (APDU(s))) for encoding or writing the one or more credentials and/or credential updates associated with the request to credential device 108. For example, but not limited by such example, cloud service may compute one or more commands (e.g., APDU(s)) for generating any one or more of a file, file object, dedicated file, application dedicated file (ADF), database entry, or database object, etc. comprising the appropriate credential(s) and/or credential update(s) for storing to the credential device.

In step 218, cloud service 106 sends the one or more commands (e.g., APDU(s)) to in-field device 106. In some examples, cloud service 106 encrypts the one or more commands (e.g., APDU(s)), for example, using or based on the information from credential device 108 (and received via in-field device 108) for establishing a secure communication channel, such as one or more cryptographic keys provided in or based on the information from the credential device. In addition, the one or more commands (e.g., APDU(s)) and/or any other portion of data being sent by cloud service 106 may be encrypted at the payload level (e.g., at rest encryption).

In step 220, in-field device 106 passes along the one or more commands (e.g., APDU(s)) to credential device 108. Again, in-field device 106 may generally act as an intermediate or proxy device for communication between cloud service 104 and credential device 108. In-field device 106 need not, and in some cases should not, be able to decrypt or interpret any communication between cloud service 104 and credential device 108 or otherwise have access to any unencrypted information communicated between the cloud service and the credential device.

In step 222, credential device 108 may decrypt the one or more commands (e.g., APDU(s)) at either or both of the transport or payload levels, if needed, and use the one or more commands (e.g., APDU(s)) to write or store the appropriate credential(s) and/or credential update(s) to the credential device. In some examples, credential device 108 may use the one or more commands (e.g., APDU(s)) to write or store an ADF, comprising the appropriate credential(s) and/or credential update(s), to the credential device.

In step 224, credential device 108 may return, to in-field device 106, a confirmation that the appropriate credential(s) and/or credential update(s) (e.g., the ADF) were properly encoded (e.g., stored) to the credential device. In some examples, credential device 108 may alternatively return a message or other indication, such as a rejection or error message, that the appropriate credential(s) and/or credential update(s) were not properly encoded to the credential device.

In step 226, in-field device 106 may forward, to cloud service 104, the confirmation (or rejection, error, etc.), or generate and send, to cloud service 104, a new confirmation (or rejection, error, etc.) that the appropriate credential(s) and/or credential update(s) were properly/not properly encoded to credential device 108. Likewise, in step 228, cloud service 104 may forward, to administrator device 102, the confirmation (or rejection, error, etc.), or generate and send, to administrator device 102, a new confirmation (or rejection, error, etc.) that the appropriate credential(s) and/or credential update(s) were properly/not properly encoded to credential device 108.

Throughout steps 210-226, in-field device 106 may generally act as an intermediate or proxy device for establishing a secure communication channel between cloud service 104 and credential device 108 and for subsequent secure communication therebetween. Accordingly, in-field device 106, or for example a corresponding app installed thereon as described above, may not have any other functionality or business logic beyond that triggered by cloud service 104 and/or required to complete steps 210-226. In-field device 106 (or corresponding app installed thereon), need not, and in some cases should not, be able to decrypt or interpret any communication between cloud service 104 and credential device 108 or otherwise have access to any unencrypted information communicated between the cloud service and the credential device. Accordingly, in some examples, in-field device 106 does not store any unencrypted or otherwise sensitive information involved with the in-field encoding of credential device 108.

Figure 2B:
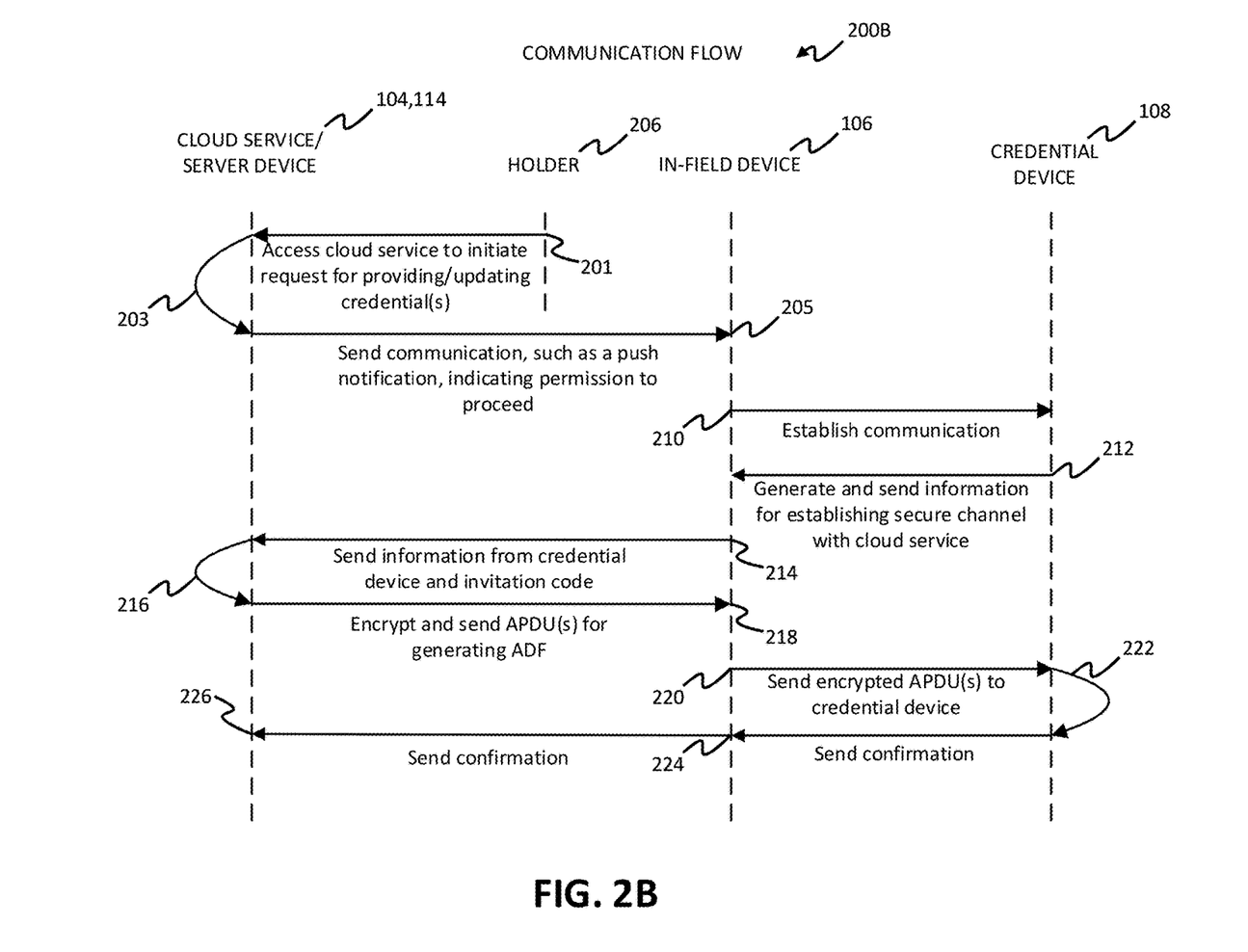
FIG. 2B illustrates another example method or communication flow for in-field encoding of access credentials to a credential device.

FIG. 2B illustrates another example method or communication flow for in-field encoding of access credentials to a credential device 200B, according to the present disclosure, that can avoid or limit the need or use of administrator device 102. In step 201, rather than initiating a request via administrator device 102 for encoding one or more credentials to credential device 108 and/or encoding an update to one or more credentials stored on the credential device, user/holder 206 may access cloud service 104 and/or server device(s) 114 (which, as indicated previously, may be referred to collectively or individually herein simply as cloud service 104) to initiate such a request directly. In an example, user/holder 206 may access cloud service 104 and initiate or submit the request through an app installed on in-field device 106, such as the app for facilitating in-field encoding of credential devices described above. In additional or alternative examples, user/holder 206 may send a request for encoding one or more credentials to credential device 108 and/or encoding an update to one or more credentials stored on the credential device to cloud service 104 by any suitable means of communication, including but not limited to, email, text (e.g., SMS or MMS messaging), etc.

In step 203, cloud service 104 may verify permissions of user/holder 206 and/or authenticate the user/holder to confirm the user/holder has the authority to request and/or obtain the requested encoding of one or more credentials to credential device 108 and/or encoding of an update to one or more credentials stored on the credential device. In additional or alternative examples, cloud service 104 may communicate with administrator device 102, such as via network 110, to confirm user/holder 206 has the requisite authority.

In step 205, cloud service 104 may send a communication to in-field device 106, such as but not limited to a push notification that user/holder may open or activate, providing in-field device 106 with permission to proceed to step 210, in which the in-field device, or the app executing on the in-field device, may establish communication with credential device 108. The communication (e.g., push notification) may include a code or identifier for the request, such as the invitation code previously described. In other examples, in lieu of step 205, method 200B may comprise steps 204 and 208 as described previously with respect to FIG. 2A.

Steps 210 through 226 of method 200B in FIG. 2B are the same as in method 200A in FIG. 2A. Method 200B may also include step 228, as described with respect to method 200A, if desired.

Although FIGS. 2A and 2B illustrate example methods as comprising sequential steps or processes as having a particular order of operations, some or many of the steps or operations in the methods of FIGS. 2A and 2B can be performed in parallel or concurrently, and FIGS. 2A and 2B should be read in the context of the various example embodiments of the present disclosure. The order of the method steps or process operations illustrated in FIGS. 2A and 2B may be rearranged for some embodiments. Similarly, the methods illustrated in FIGS. 2A and 2B could have additional steps or operations not included therein or fewer steps or operations than those shown.

In-field encoding of access credentials according to the various examples described herein provides several advantages. For example, such in-field encoding avoids the need to replace credential devices, such as plastic credential cards, with new credential devices every time credentials need to be added or updated, thereby saving time and decreasing costs and waste (e.g., less plastic waste). In-field encoding of access credentials according to the various examples described herein further enables in-field encoding of credentials without the need for limited and specialized in-field equipment, such as the HID® iCLASS SE® CP1000 Encoder offered by HID Global Corporation, based in Austin, Texas, and without the need to physically locate and meet a local administrator with access to such limited and specialized equipment. Moreover, in-field encoding of access credentials according to the various examples described herein is secure. Still further, in-field encoding of access credentials according to the various examples described herein enables a larger freedom of choice of credential form factors.

As indicated previously, there are many applications for which encoding access credentials to a credential device is desirable, and thus for which in-field encoding access credentials to a credential device, as described herein, may be suitable. Some examples include physical and logical access control systems. In general, access control covers a range of systems and methods to govern access, for example by people, to secure areas or secure assets. Physical access control includes identification of authorized users or devices (e.g., vehicles, drones, etc.) and actuation of a gate, door, or other mechanism used to secure an area or actuation of a control mechanism, e.g., a physical or electronic/software control mechanism, permitting access to a secure physical asset, such as but not limited to a computing device (e.g., desktop computer, mobile device, wearable electronic device, copier/printer, and the like). Logical access control includes identification of authorized users or devices to provide access to logical assets, such as but not limited to, an application, a cloud-based service, or a financial or personal account. Physical access control systems (PACS) and logical access control systems (LACS) can generally include a reader (e.g., an online or offline reader) that holds authorization data and can be capable of determining whether credentials (e.g., from credential or key devices such as RFID chips in cards and fobs or personal electronic devices such as mobile phones) are authorized for accessing the secure area or asset. Alternatively, PACS/LACS can include a host server to which readers are operably connected (e.g., via a controller) in a centrally managed configuration. In centrally managed configurations, readers can obtain credentials from credential or key devices and pass those credentials to the PACS/LACS host server. The host server can then determine whether the credentials authorize access to the secure area or secure asset and command the actuator or other control mechanism accordingly or can command the reader to operate the actuator or other control mechanism accordingly. Wireless PACS/LACS, e.g., those that utilize wireless communication between the reader and the credential or key device, such as for secure credential exchange, can use RFID or personal area network (PAN) technologies, such as the IEEE 802.15.1, Bluetooth, Bluetooth Low Energy (BLE), near field communications (NFC), ZigBee, GSM, CDMA, Wi-Fi, UWB, etc.

Figure 3:
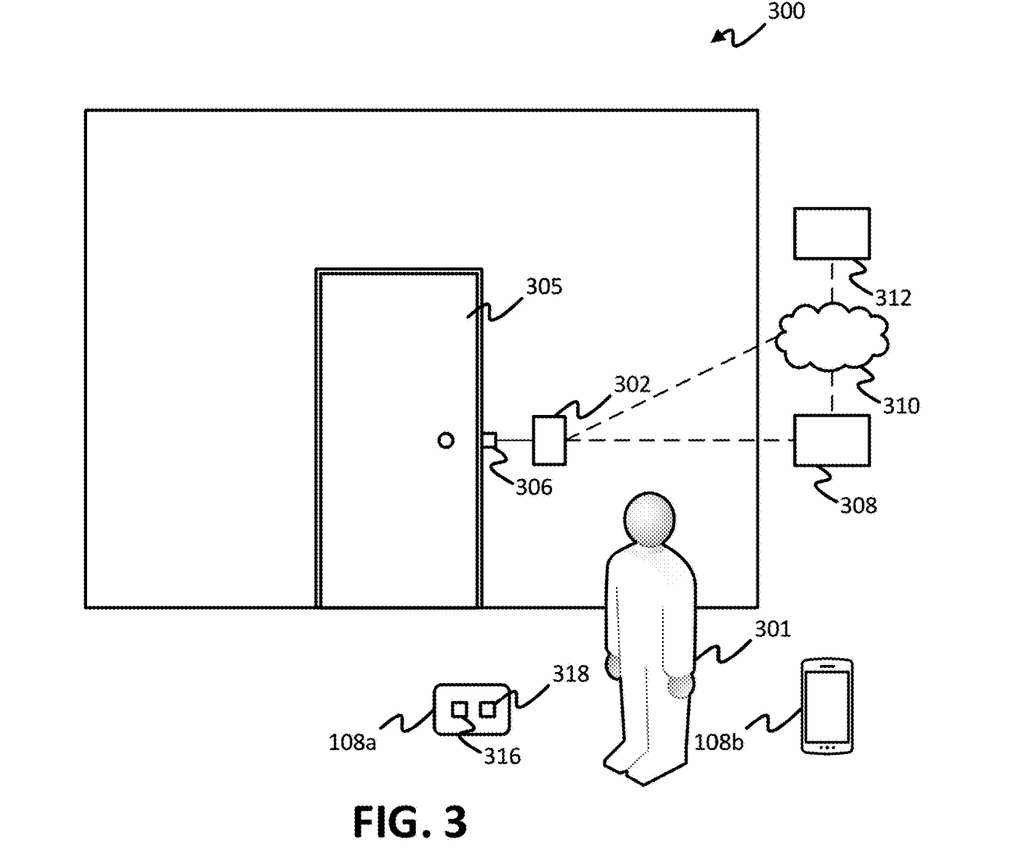
FIG. 3 illustrates a front view of an example access control system (ACS), or portions thereof, including an ACS reader, an ACS control panel, an ACS host server, and a credential.
Figure 4:
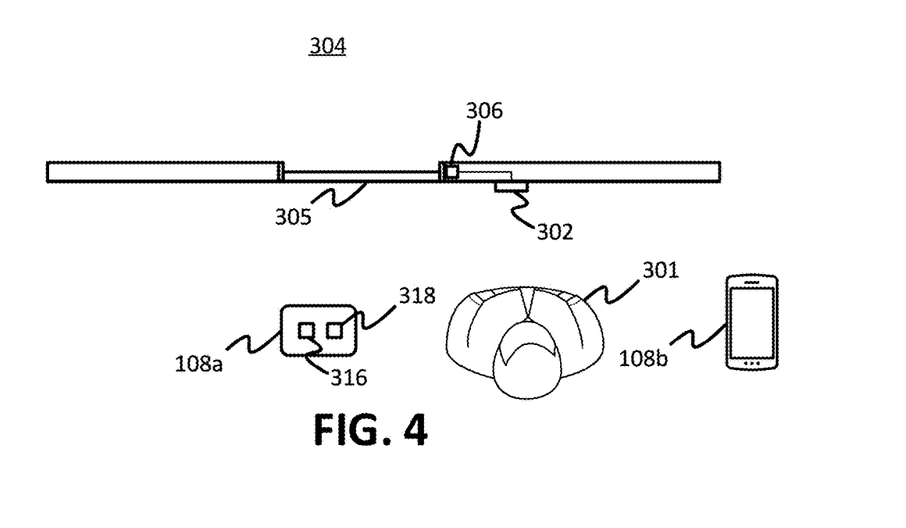
FIG. 4 illustrates a top cross-sectional view of an example ACS, or portions thereof.

FIGS. 3 and 4 illustrate an example access control system (ACS) 300, or portions thereof. While FIGS. 3 and 4 primarily illustrate a PACS, it is recognized that the present disclosure similarly relates to LACS, and that while the secure asset in FIGS. 3 and 4 is illustrated as a secure area surrounded by a wall and protected by a physical access point (e.g., a door) and the control mechanism is described as a locking mechanism, the secure asset could instead be a logical asset (e.g., an application, a cloud-based service, or a financial or personal account), the control mechanism could be an electronic/software control mechanism separate from or incorporated with the reader device, and the reader device need not be fixed and could include a device owned or operated by the user, such as a mobile device (e.g., smart phone, tablet, or the like).

ACS 300 can include a reader device, or simply reader, 302 associated with a secure area, access point, or other asset 304. In some cases, such as in the example illustrated in FIGS. 3 and 4, secure asset 304 is a secure area secured by an access point 305, such as a door, gate, turnstile or the like controlling or permitting authorized access to the secure area, but as explained above, secure asset 304 may alternatively be a logical asset. Reader 302 can include or be operably connected with a control mechanism 306, such as but not limited to a locking mechanism in the case of PACS or an electronic/software control mechanism in the case of LACS, that controls whether access via access point 305 is permitted (e.g., can be opened or accessed) or may even control opening and/or closing of the access point. Reader 302 can be an offline reader, e.g., a reader not connected to a control panel or host server, and in such cases may make its own access control determinations and directly operate or command control mechanism 306, accordingly. Reader 302 can be a wireless reader device, in that the reader may communicate with credential or key devices via wireless technologies, such as RFID or PAN technologies, such as the IEEE 802.15.1, Bluetooth, Bluetooth Low Energy (BLE), near field communications (NFC), ZigBee, GSM, CDMA, Wi-Fi, UWB, etc. Reader 302 may also include a PIN pad, touch screen, fingerprint reader, magnetic stripe reader, chip reader, or other non-wireless input means for receiving credential or other information, such as a PIN or other secret code, biometric information such as a fingerprint, or information from a magnetic stripe card or chip card, for example. Reader 302 may also include facial recognition capabilities.

In some cases, reader 302 can be connected by wire or wirelessly to a control panel 308. In such cases, reader 302 may transmit credential information to control panel 308, and the control panel may make, or may share responsibilities with the reader in making, access control determinations. Based on the access control determinations, control panel 308 can instruct reader 302 to operate or command control mechanism 306, accordingly. Alternately, control panel 308 can be connected directly or wirelessly to control mechanism 306, and in such cases may directly operate or command the control mechanism, accordingly, bypassing reader 302.

In some cases, reader 302 and control panel 308, and even control mechanism 306, can be connected to a wired or wireless network 310 and communicate with each other, as described above, via the network. Example networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), networks based on the IEEE 802.15.4 family of standards, and peer-to-peer (P2P) networks, among others. If ACS 300 is managed by a remote system, the ACS can include a host server 312 connected by wire or wirelessly to network 310 and that may communicate with reader 302 and/or control panel 308. In such cases, reader 302 can transmit credential information to host server 312 via network 310 or can transmit credential information to control panel 308, which can then transmit the credential information to the host server via the network. Host server 312 may make, or may share responsibilities with reader 302 and/or control panel 308 in making, access control determinations. Based on the access control determinations, host server 312 can instruct reader 302, directly or indirectly via control panel 308, to operate or command control mechanism 306, accordingly. Alternately, host server 312 can instruct control panel 308 to operate or command control mechanism 306, accordingly. In still another example, host server 312 can be connected via network 310 to control mechanism 306 and directly operate or command the control mechanism, accordingly, bypassing reader 302 and control panel 308.

Figure 5:
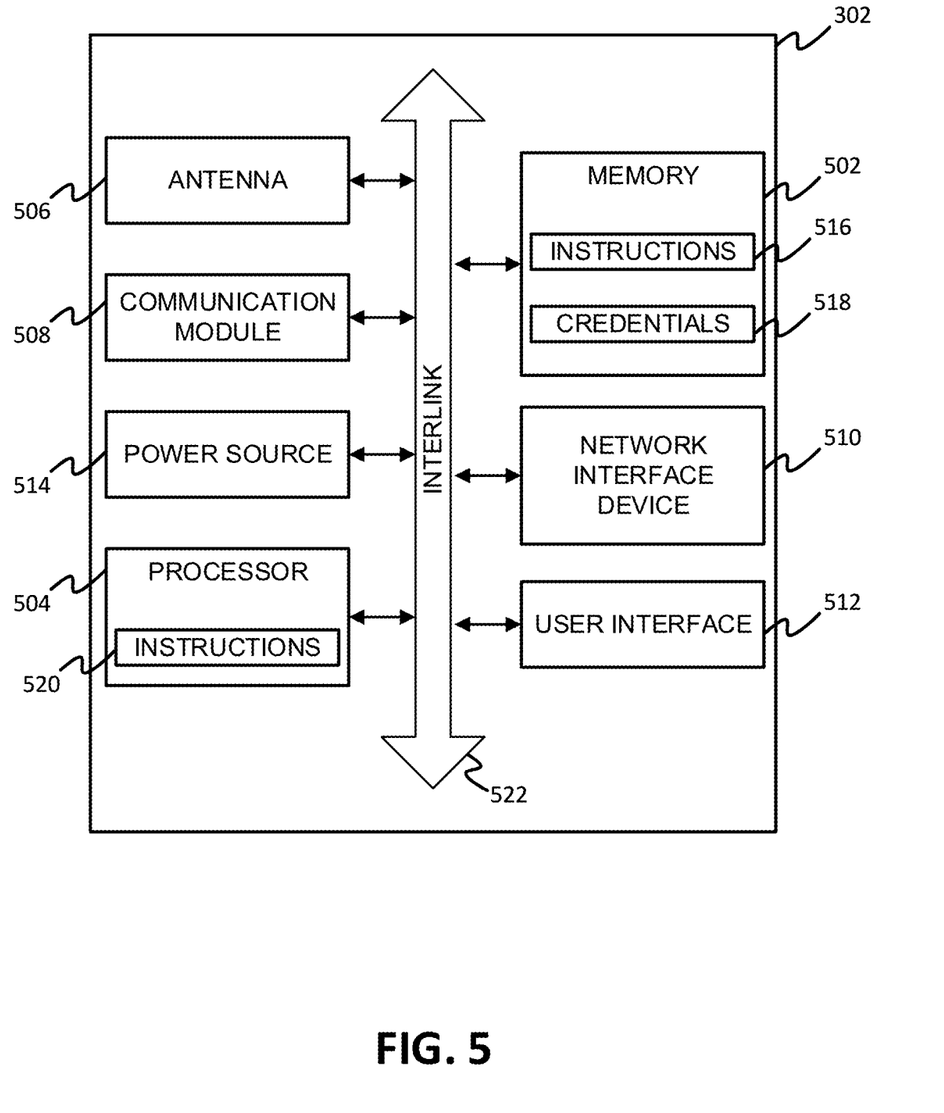
FIG. 5 illustrates a block diagram schematic of various components of an example ACS reader.

FIG. 5 illustrates a block diagram schematic of various components of an example reader 302. In general, reader 302 can include one or more of a memory 502, a processor 504, one or more antennas 506, a communication module 508, a network interface device 510, a user interface 512, and a power source or supply 514. While reader 302 is illustrated in FIG. 3 as a device affixed to a surface, for example a wall, reader 302 may also be a free-standing device or a portable device, such as but not limited to a mobile device. Moreover, in some example embodiments, such as but not limited to certain LACS embodiments, reader 302 may be a mobile device of the user, wherein, for example, the user may be attempting to access a logical asset via the user's own mobile device.

Memory 502 can be used in connection with the execution of application programming or instructions by processor 504, and for the temporary or long-term storage of program instructions or instruction sets 516 and/or credential or authorization data 518, such as credential data, credential authorization data, or access control data or instructions. For example, memory 502 can contain executable instructions 516 that are used by the processor 504 to run other components of reader 302 and make access determinations based on credential or authorization data 518. Memory 502 can comprise a computer readable medium that can be any medium that can contain, store, communicate, or transport data, program code, or instructions for use by or in connection with reader 302. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), any solid-state storage device, in general, a compact disc read-only memory (CD-ROM), or other optical or magnetic storage device. Computer readable media includes, but is not to be confused with, computer readable storage medium, which is intended to cover all physical, non-transitory, or similar embodiments of computer readable media.

Processor 504 can correspond to one or more computer processing devices or resources. For instance, processor 504 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 504 can be provided as a microprocessor, Central Processing Unit (CPU), or plurality of microprocessors or CPUs that are configured to execute instructions sets stored in an internal memory 520 and/or memory 502.

Antenna 506 can correspond to one or multiple antennas and can be configured to provide for wireless communications between, for example, reader 302 and a credential or key device. Antenna(s) 506 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 506 can be RF antenna(s), and as such, may transmit/receive RF signals through free-space to be received/transferred by a credential or key device having an RF transceiver.

Communication module 508 can be configured to communicate according to any suitable communications protocol with one or more different systems or devices either remote or local to reader 302, such as one or more control mechanisms 306 or control panel 308.

Network interface device 510 includes hardware to facilitate communications with other devices, such as control panel 308 or host server 312, over a communication network, such as network 310, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), networks based on the IEEE 802.15.4 family of standards, and peer-to-peer (P2P) networks, among others. In some examples, network interface device 510 can include an Ethernet port or other physical jack, a Wi-Fi card, a Network Interface Card (NIC), a cellular interface (e.g., antenna, filters, and associated circuitry), or the like. In some examples, network interface device 510 can include one or more antennas to wirelessly communicate using, for example, at least one of single-input multiple-output (SIMO), multiple-input multiple-output (MIMO), or multiple-input single-output (MISO) techniques.

User interface 512 can include one or more input devices and/or display devices. Examples of suitable user input devices that can be included in user interface 512 include, without limitation, one or more buttons, a keyboard, a mouse, a touch-sensitive surface, a stylus, a camera, a microphone, a PIN pad, touch screen, fingerprint reader, magnetic stripe reader, chip reader, etc. Examples of suitable user output devices that can be included in user interface 512 include, without limitation, one or more LEDs, a LCD panel, a display screen, a touchscreen, one or more lights, a speaker, etc. It should be appreciated that user interface 512 can also include a combined user input and user output device, such as a touch-sensitive display or the like.

Power source 514 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the reader 302. Power source 514 can also include some implementation of surge protection circuitry to protect the components of reader 302 from power surges.

Reader 302 can also include one or more interlinks or buses 522 operable to transmit communications between the various hardware components of the reader. A system bus 522 can be any of several types of commercially available bus structures or bus architectures.

Figure 6:
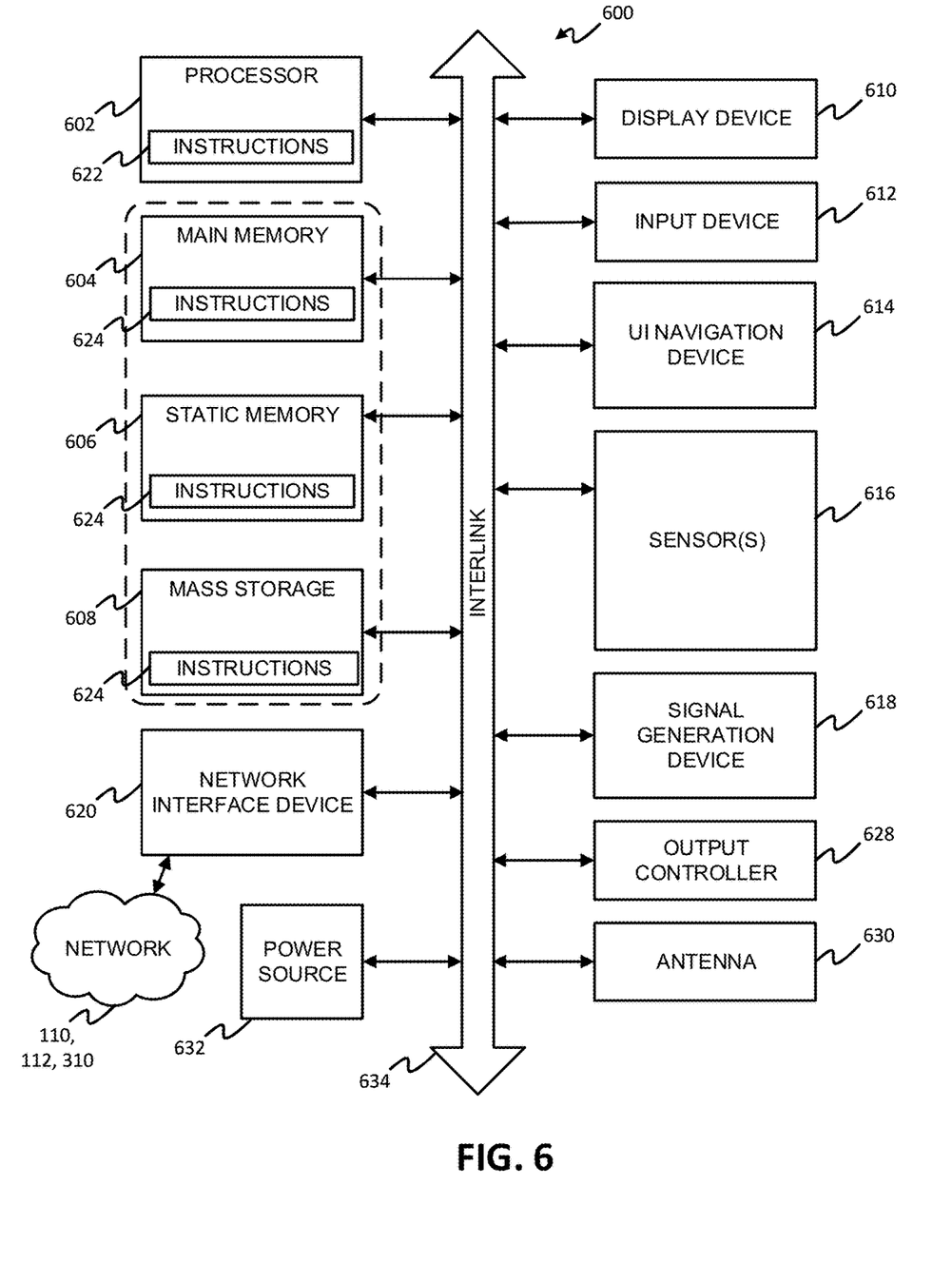
FIG. 6 illustrates a block diagram schematic of various example components of an example machine that may be used as, for example, an administrator device, one or more hardware devices of a cloud service, a server, an in-field device, an ACS control panel or ACS host server, according to the present disclosure.

FIG. 6 illustrates a block diagram schematic of various example components of an example machine 600 that can be used as, for example, administrator device 102, one or more hardware devices of cloud service 104, server(s) 114, in-field device 106, control panel 308, and/or host server 312. Credential device 108 may also include one or more of the example components illustrated in FIG. 6, which may depend on the form factor of the credential device. Examples, as described herein, can generally include, or can operate by, logic or a number of components, modules, or mechanisms in machine 600. Modules may be hardware, software, or firmware communicatively coupled to one or more processors in order to carry out the operations described herein. Generally, circuitry (e.g., processing circuitry) of example machine 600 may include a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In some examples, hardware of the circuitry can be immutably designed to carry out a specific operation (e.g., hardwired). In some examples, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions permit embedded hardware (e.g., the execution units or a loading mechanism) to create members of the circuitry in hardware via the variable connections to carry out portions of the specific operation when in operation. Accordingly, in some examples, the machine readable medium elements are part of the circuitry or are communicatively coupled to the other components of the circuitry when the device is operating. In some examples, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional and/or more specific examples of components with respect to machine 600 follow.

In some embodiments, machine 600 can operate as a standalone device or can be connected (e.g., networked) to other machines. In a networked deployment, machine 600 can operate in the capacity of a server machine, a client machine, or both in server-client network environments. In some examples, machine 600 can act as a peer machine in a peer-to-peer (P2P) (or other distributed) network environment. Machine 600 can be or include a PC, a tablet PC, a set-top box (STB), a PDA, a mobile telephone, a web appliance, a network router, switch or bridge, an RFID smartcard or other proximity-based card, access control card, electronic key, key fob, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 can include a hardware processor 602 (e.g., a central processing unit (CPU), a graphics processing unit (GPU), a hardware processor core, or any combination thereof) and a main memory 604, a static memory (e.g., memory or storage for firmware, microcode, a basic-input-output (BIOS), unified extensible firmware interface (UEFI), etc.) 606, and/or mass storage 608 (e.g., hard drives, tape drives, flash storage, or other block devices) some or all of which can communicate with each other via an interlink (e.g., bus) 634. Machine 600 can further include a display device 610, an input device 612, and/or a user interface (UI) navigation device 614. Examples of suitable display devices include, without limitation, one or more LEDs, a LCD panel, a display screen, a touchscreen, one or more lights, etc. Example input devices and UI navigation devices include, without limitation, one or more buttons, a keyboard, a touch-sensitive surface, a stylus, a camera, a microphone, etc. In some examples, one or more of the display device 610, input device 612, and/or UI navigation device 614 can be a combined unit, such as a touch screen display. Machine 600 can additionally include a signal generation device 618 (e.g., a speaker), a network interface device 620, one or more antennas 630, a power source 632, and one or more sensors 616, such as a global positioning system (GPS) sensor, compass, accelerometer, or other sensor. Machine 600 can include an output controller 628, such as a serial (e.g., universal serial bus (USB)), parallel, or other wired or wireless (e.g., infrared (IR), NFC, etc.) connection to communicate with or control one or more peripheral devices (e.g., a printer, card reader, etc.).

Processor 602 can correspond to one or more computer processing devices or resources. For instance, processor 602 can be provided as silicon, as a Field Programmable Gate Array (FPGA), an Application-Specific Integrated Circuit (ASIC), any other type of Integrated Circuit (IC) chip, a collection of IC chips, or the like. As a more specific example, processor 602 can be provided as a microprocessor, Central Processing Unit (CPU), or plurality of microprocessors or CPUs that are configured to execute instructions sets stored in an internal memory 622 and/or memory 604, 606, 608.

Any of memory 604, 606, and 608 can be used in connection with the execution of application programming or instructions by processor 602 for performing any of the functionality or methods described herein, and for the temporary or long-term storage of program instructions or instruction sets 624 and/or other data for performing any of the functionality or methods described herein, such as for in-field encoding of access credentials as described herein. Any of memory 604, 606, 608 can comprise a computer readable medium that can be any medium that can contain, store, communicate, or transport data, program code, or instructions 624 for use by or in connection with machine 600. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or EEPROM), Dynamic RAM (DRAM), a solid-state storage device, in general, a compact disc read-only memory (CD-ROM), or other optical or magnetic storage device. As noted above, computer readable media includes, but is not to be confused with, computer readable storage medium, which is intended to cover all physical, non-transitory, or similar embodiments of computer readable media.

Network interface device 620 includes hardware to facilitate communications with other devices over a communication network, such as networks 110, 112, 310, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi or IEEE 802.16 family of standards known as WiMax), networks based on the IEEE 802.15.4 family of standards, and peer-to-peer (P2P) networks, among others. In some examples, network interface device 620 can include an Ethernet port or other physical jack, a Wi-Fi card, a Network Interface Card (NIC), a cellular interface (e.g., antenna, filters, and associated circuitry), or the like. In some examples, network interface device 620 can include one or more antennas to wirelessly communicate using, for example, at least one of single-input multiple-output (SIMO), multiple-input multiple-output (MIMO), or multiple-input single-output (MISO) techniques.

Antenna 630 can correspond to one or multiple antennas and can be configured to provide for wireless communications between machine 600 and another device. Antenna(s) 630 can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, antenna(s) 630 can be RF antenna(s), and as such, may transmit/receive RF signals through free-space to be received/transferred by another device having an RF transceiver.

Power source 632 can be any suitable internal power source, such as a battery, capacitive power source or similar type of charge-storage device, etc., and/or can include one or more power conversion circuits suitable to convert external power into suitable power (e.g., conversion of externally-supplied AC power into DC power) for components of the machine 600. Power source 632 can also include some implementation of surge protection circuitry to protect the components of machine 600 from power surges.

As indicated above, machine 600 can include one or more interlinks or buses 634 operable to transmit communications between the various hardware components of the machine. A system bus 634 can be any of several types of commercially available bus structures or bus architectures.

With reference back to FIGS. 3 and 4, in use, as a user 301 (which may or may not be the same as user/holder 206) having a credential or key device 108 (illustrated, for example, as a smartcard 108a or mobile device 108b) approaches reader 302 associated with access point 305, the credential device 108 may communicate the user's credential or credential data to the reader, for example, via a suitable RFID or PAN technology. In some examples, credential device 108 can be a portable device having memory 316, storing one or more user credentials or credential data, and a reader interface (i.e., an antenna and Integrated Circuit (IC) chip) 318, which permits the credential to exchange data with a reader device, such as reader 302, via a credential interface of the reader device, such as antenna 506. More generally, and as indicated above, credential device 108 may include some, any, or all of the various components described above with respect to the block diagram schematic of FIG. 6. In some example embodiments, such as but not limited to certain LACS embodiments, reader 302 and credential device 108 may be the same device, wherein, for example, the user may be attempting to access a logical asset via the user's own mobile device (e.g., mobile device 108b). If reader 302, control panel 308, and/or host server 312 determine that the user's 301 credential or credential data provided by credential device 108 is valid and/or authorized, reader 302, control panel 308, or host server 312 may operate control mechanism 306 to allow access to the secure asset 304 by the user 301 having the credential device.

ADDITIONAL EXAMPLES

Example 1 includes subject matter (such as a method) for in-field encoding of credentials to a credential device. The subject matter comprises receiving a request from an administrator device to at least one of add or update credentials to a credential device; sending an invitation code to a user of an in-field device, the in-field device being separate from the credential device; receiving, from the in-field device, the invitation code along with information from the credential device for establishing a secure communication channel with the credential device; establishing a secure communication channel with the credential device using the in-field device as an intermediate; generating one or more commands for encoding credentials to the credential device based on the request; and sending the one or more commands, via the secure communication channel using the in-field device as an intermediate, to the credential device.

In Example 2, the subject matter of Example 1 optionally includes wherein the invitation code is substantially unique for at least a defined period of time.

In Example 3, the subject matter of either Example 1 or Example 2 optionally includes wherein the information from the credential device for establishing a secure communication channel with the credential device is encrypted.

In Example 4, the subject matter of any of Examples 1 to 3 optionally includes wherein the user is the holder of the credential device.

In Example 5, the subject matter of any of Examples 1 to 4 optionally includes wherein the in-field device is a mobile device of the user.

In Example 6, the subject matter of any of Examples 1 to 5 optionally includes wherein the credential device is at least one of an RFID card, a key fob, or a wearable electronic device.

In Example 7, the subject matter of any of Examples 1 to 6 optionally includes wherein the in-field device does not have access to any information communicated between the cloud service and the credential device using the secure channel in an unencrypted form.

Example 8 includes subject matter (such as a method) for in-field encoding of credentials to a credential device. The subject matter comprises receiving a request to at least one of add or update credentials to a credential device; providing an invitation code for an in-field device, the in-field device being separate from the credential device; receiving, from the in-field device, the invitation code along with information from the credential device for establishing a secure communication channel with the credential device; establishing a secure communication channel with the credential device using the in-field device as an intermediate; generating one or more commands for encoding credentials to the credential device based on the request; and sending the one or more commands, via the secure communication channel using the in-field device as an intermediate, to the credential device.

In Example 9, the subject matter of Example 8 optionally includes wherein receiving the request to at least one of add or update credentials to the credential device comprises receiving the request from an administrator device.

In Example 10, the subject matter of either Example 8 or Example 9 optionally includes wherein providing an invitation code for an in-field device comprises sending the invitation code to a user of the in-field device.

In Example 11, the subject matter of Example 10 optionally includes wherein the user is the holder of the credential device.

In Example 12, the subject matter of either Example 10 or Example 11 optionally includes wherein the in-field device is a mobile device of the user.

In Example 13, the subject matter of Example 8 optionally includes wherein receiving the request to at least one of add or update credentials to the credential device comprises receiving the request from the in-field device.

In Example 14, the subject matter of either Example 8 or Example 13 optionally includes wherein providing an invitation code for an in-field device comprises sending a communication with the invitation code to the in-field device.

In Example 15, the subject matter of Example 14 optionally includes wherein the communication is a push notification.

In Example 16, the subject matter of any of Examples 8 to 15 optionally includes wherein the information from the credential device for establishing a secure communication channel with the credential device is encrypted.

In Example 17, the subject matter of any of Examples 8 to 16 optionally includes wherein the credential device is at least one of an RFID card, a key fob, or a wearable electronic device.

In Example 18, the subject matter of any of Examples 8 to 17 optionally includes wherein the in-field device does not have access to any information communicated between the cloud service and the credential device using the secure channel in an unencrypted form.

Example 19 includes subject matter (such as a method) for in-field encoding of credentials to a credential device. The method comprises receiving, at an in-field device, an invitation code corresponding to a request from to at least one of add or update credentials to a credential device, the credential device being separate from the in-field device; establishing, with the in-field device, a communication with the credential device to request information from the credential device for establishing a secure communication channel with the credential device; receiving, at the in-field device the information from the credential device and forwarding the information from the credential device along with the invitation code to a credentialing service; receiving, at the in-field device, from the credentialing service, one or more commands for encoding credentials to the credential device based on the request; and forwarding, from the in-field device, the one or more commands to the credential device, enabling the credential device to encode the credentials to the credential device.

In Example 20, the subject matter of Example 19 optionally includes wherein the invitation code is received via an app executing on the in-field device.

In Example 21, the subject matter of either Example 19 or Example 20 optionally includes wherein communication between the in-field device and the credential device uses a radio frequency (RF) protocol.

In Example 22, the subject matter of any of Examples 19 to 21 optionally includes wherein communication between the in-field device and the credentialing service is via a communication network.

In Example 23, the subject matter of any of Examples 19 to 22 optionally includes wherein the information from the credential device for establishing a secure communication channel with the credential device is received, at the in-field device, encrypted.

In Example 24, the subject matter of any of Examples 19 to 23 optionally includes wherein the one or more commands for encoding credentials to the credential device based on the request are received, at the in-field device, encrypted.

Example 25 includes subject matter relating to a non-transitory computer readable medium comprising executable program code, that when executed by one or more processors of an in-field device, causes the one or more processors to: receive an invitation code corresponding to a request to at least one of add or update credentials to a credential device, the credential device being separate from the in-field device; establish a communication with the credential device to request information from the credential device for establishing a secure communication channel with the credential device; receive the information from the credential device and forward the information from the credential device along with the invitation code to a credentialing service; receive one or more commands from the credentialing service for encoding credentials to the credential device based on the request; and forward the one or more commands to the credential device, enabling the credential device to encode the credentials to the credential device.

In Example 26, the subject matter of Example 25 optionally includes wherein the invitation code is received via an app executing on the in-field device.

In Example 27, the subject matter of either Example 25 or Example 26 optionally includes wherein the executable program code causes the one or more processors to communicate with the credential device using a radio frequency (RF) protocol.

In Example 28, the subject matter of any of Examples 25 to 27 optionally includes wherein the executable program code causes the one or more processors to communicate with the credentialing service using a communication network.

In Example 29, the subject matter of any of Examples 25 to 28 optionally includes wherein the information from the credential device for establishing a secure communication channel with the credential device is received encrypted.

In Example 30, the subject matter of any of Examples 25 to 29 optionally includes wherein the one or more commands for encoding credentials to the credential device based on the request are received encrypted.

In Example 31, the subject matter of any of Examples 25 to 30 optionally includes wherein the executable program code enables the in-field device to act as an intermediate for communication between the credentialing service and the credential device, and does not enable the in-field device to decrypt or interpret communication between the credentialing service and the credential device.

Additional Notes

The above detailed description includes references to the accompanying drawings, which form a part of the detailed description. The drawings show, by way of illustration, specific embodiments that can be practiced. These embodiments may also be referred to herein as "examples." Such embodiments or examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. That is, the above-described embodiments or examples or one or more aspects, features, or elements thereof can be used in combination with each other.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure or portions thereof may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. In the context of this disclosure, a computer readable medium may be any medium that can contain, store, communicate, or transport the program for use by or in connection with the systems disclosed herein. As indicated above, the computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical, magnetic, or solid state storage device. As noted above, computer-readable media includes, but is not to be confused with, computer-readable storage medium, which is intended to cover all physical, non-transitory, or similar embodiments of computer-readable media.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method for in-field encoding of credentials to a credential device, the method performed by a credentialing service and comprising:
   receiving a request to at least one of add or update credentials to a credential device of a user;
   in response to receiving the request, providing an invitation code for an in-field device, the in-field device being separate from the credential device, and the in-field device and the credential device both being issued to the user;
   receiving, from the in-field device, the invitation code along with information provided to the in-field device from the credential device for establishing a secure communication channel with the credential device, the information from the credential device generated by the credential device and including at least one of one or more cryptographic keys or information used to generate one or more cryptographic keys, the information from the credential device being encrypted by the credential device prior to being provided to the in-field device;
   establishing a secure communication channel with the credential device using the in-field device as an intermediate;
   generating one or more commands for encoding credentials to the credential device based on the request; and
   sending the one or more commands, via the secure communication channel using the in-field device as an intermediate, to the credential device.

2. The method of claim 1, wherein receiving the request to at least one of add or update credentials to the credential device comprises receiving the request from an administrator device.

3. The method of claim 2, wherein providing an invitation code for an in-field device comprises sending the invitation code to the user.

4. The method of claim 1, wherein the in-field device is a mobile device of the user.

5. The method of claim 1, wherein receiving the request to at least one of add or update credentials to the credential device comprises receiving the request from the in-field device.

6. The method of claim 5, wherein providing an invitation code for an in-field device comprises sending a communication with the invitation code to the in-field device.

7. The method of claim 6, wherein the communication is a push notification.

8. The method of claim 1, wherein the credential device is at least one of an RFID card, a key fob, or a wearable electronic device.

9. The method of claim 1, wherein the in-field device does not have access to any information communicated between the credentialing service and the credential device using the secure channel in an unencrypted form.

10. A method for in-field encoding of credentials to a credential device, the method comprising:
- receiving, at an in-field device from at least one of a credentialing service or a user of the in-field device, an invitation code generated by the credentialing service and corresponding to a request to at least one of add or update credentials to a credential device, the credential device being separate from the in-field device, and the in-field device and the credential device both being issued to the user;
- establishing, with the in-field device, a communication with the credential device to request information from the credential device for establishing a secure communication channel with the credential device;
- receiving, at the in-field device, the information from the credential device and forwarding the information from the credential device along with the invitation code to the credentialing service, the information from the credential device generated by the credential device and including at least one of one or more cryptographic keys or information used to generate one or more cryptographic keys, the information from the credential device being encrypted by the credential device prior to being received at the in-field device;
- receiving, at the in-field device, from the credentialing service, one or more commands for encoding credentials to the credential device based on the request; and
- forwarding, from the in-field device, the one or more commands to the credential device, enabling the credential device to encode the credentials to the credential device.

11. The method of claim 10, wherein the invitation code is received via an app executing on the in-field device.

12. The method of claim 10, wherein:
- communication between the in-field device and the credential device uses a radio frequency (RF) protocol; and
- communication between the in-field device and the credentialing service is via a communication network.

13. The method of claim 12, wherein the one or more commands for encoding credentials to the credential device based on the request are received, at the in-field device, encrypted.

14. A non-transitory computer readable medium comprising executable program code, that when executed by one or more processors of an in-field device, causes the one or more processors to:
- receive, from at least one of a credentialing service or a user of the in-field device, an invitation code previously assigned by the credentialing service to a request to at least one of add or update credentials to a credential device, the credential device being separate from the in-field device, and the in-field device and the credential device both being issued to the user;
- establish a communication with the credential device to request information from the credential device for establishing a secure communication channel with the credential device;
- receive the information from the credential device and forward the information from the credential device along with the invitation code to the credentialing service, the information from the credential device generated by the credential device and including at least one of one or more cryptographic keys or information used to generate one or more cryptographic keys, the information from the credential device being encrypted by the credential device prior to being received at the in-field device;
- receive one or more commands from the credentialing service for encoding credentials to the credential device based on the request; and
- forward the one or more commands to the credential device, enabling the credential device to encode the credentials to the credential device.

15. The non-transitory computer readable medium of claim 14, wherein the invitation code is received via an app executing on the in-field device.

16. The non-transitory computer readable medium of claim 14, wherein the executable program code causes the one or more processors to:
- communicate with the credential device using a radio frequency (RF) protocol; and
- communicate with the credentialing service using a communication network.

17. The non-transitory computer readable medium of claim 14, wherein the one or more commands for encoding credentials to the credential device based on the request are received encrypted.

18. The non-transitory computer readable medium of claim 14, wherein the executable program code enables the in-field device to act as an intermediate for communication between the credentialing service and the credential device, and does not enable the in-field device to decrypt or interpret communication between the credentialing service and the credential device.

* * * * *